United States Patent
Lee et al.

(10) Patent No.: US 6,897,920 B2
(45) Date of Patent: May 24, 2005

(54) LIQUID CRYSTAL DISPLAY DEVICE AND METHOD OF FABRICATING THE SAME

(75) Inventors: Gue-Tai Lee, Gyungsangbuk-Do (KR); Soo-Won Seok, Gyungsangbuk-Do (KR); Ki-Bok Park, Gyungsangbuk-Do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/448,174

(22) Filed: May 30, 2003

(65) Prior Publication Data

US 2004/0125279 A1 Jul. 1, 2004

(30) Foreign Application Priority Data

Dec. 31, 2002 (KR) ........................................ 2002-88471

(51) Int. Cl.⁷ .................... G02F 1/1335; G02F 1/1333
(52) U.S. Cl. .................... 349/110; 349/110; 349/156
(58) Field of Search ................................ 349/106, 110, 349/156

(56) References Cited

U.S. PATENT DOCUMENTS

| | | | | | |
|---|---|---|---|---|---|
| 6,067,144 A | * | 5/2000 | Murouchi | ................ | 349/156 |
| 6,281,960 B1 | * | 8/2001 | Kishimoto et al. | ......... | 349/156 |
| 2002/0075441 A1 | * | 6/2002 | Fujimori et al. | ............ | 349/155 |

FOREIGN PATENT DOCUMENTS

| | | |
|---|---|---|
| JP | 2001-166310 | 6/2001 |
| JP | 2001-305552 | 10/2001 |
| JP | 2002-287155 | 10/2002 |
| JP | 2002-350857 | 12/2002 |
| JP | 2002-350867 | 12/2002 |

\* cited by examiner

*Primary Examiner*—Toan Ton
(74) *Attorney, Agent, or Firm*—Morgan, Lewis & Bockius LLP (57) ABSTRACT

A liquid crystal display device includes a substrate, a black matrix layer on the substrate and having a first plurality of openings, a color filter layer on the black matrix layer and having a second plurality of openings, and a plurality of column spacers each contacting the substrate through the first plurality and second plurality of openings.

12 Claims, 6 Drawing Sheets

LIQUID CRYSTAL DISPLAY DEVICE AND METHOD OF FABRICATING THE SAME

The present invention claims the benefit of Korean Patent Application No. 88471/2002 filed in Korea on Dec. 31, 2002, which is hereby incorporated by reference.

BACKGROUND OF THE INVENTION

1. Field of the Invention

The present invention relates to a color filter substrate structure of a liquid crystal display device, and more particularly, to a method of fabricating a color filter substrate having a spacer directly contacting a substrate.

2. Description of the Related Art

Presently, liquid crystal display (LCD) devices are commonly used in various fields from image display devices, such as computer monitors, TV receivers, and portable telephones, to information display panels used for automobiles and airplanes, for example.

Figure 1:
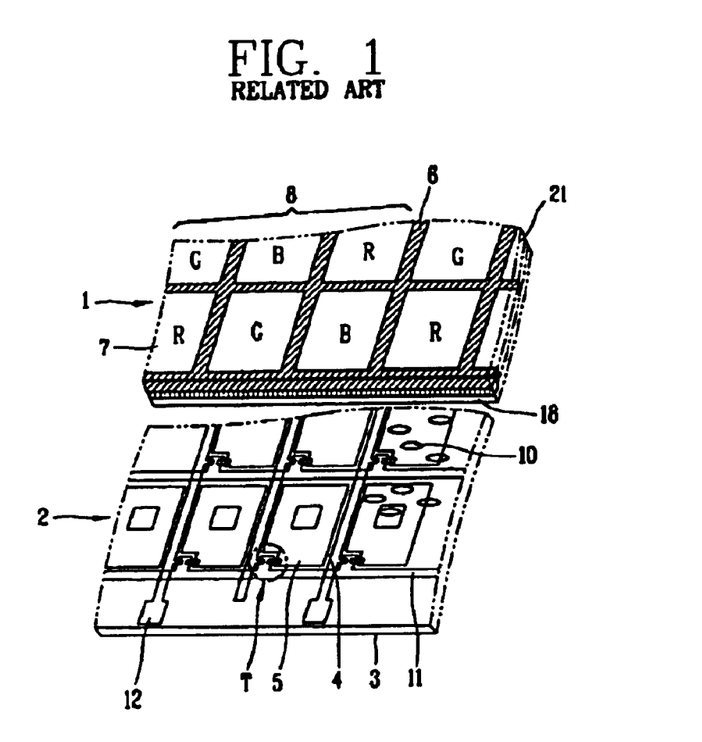
FIG. 1 is a perspective view of an upper substrate and a lower substrate of an LCD device according to the related art.

FIG. 1 is a perspective view of an upper substrate and a lower substrate of an LCD device according to the related art. In FIG. 1, an LCD device includes a transparent substrate 21, a color filter layer 8 including a black matrix 6 and a sub-color filter layer 7 of red, green, and blue on the transparent substrate 21, a color filter substrate 1 having a transparent common electrode 18 on the color filter layer 8, a TFT array substrate 2 including a plurality of switching devices T arranged on the substrate 3 in a matrix configuration, and a pixel electrode 5 corresponding to the respective switching devices T. In addition, a liquid crystal material 10 is injected between the color filter substrate 1 and the TFT array substrate 2.

A plurality of gate lines 11 arranged in rows and a plurality of data lines 12 arranged in columns are on formed on the TFT array substrate 2, such that the gate and data lines intersect and cross each other. In addition, a thin film transistor T corresponding to the switching device is formed at the intersection points between the gate lines and the data lines in a matrix configuration.

A pixel region 4 is formed on the TFT array substrate 2 corresponding to the gate lines 11 and the data lines 12, and the pixel electrode 5 is formed on the pixel region 4. The pixel electrode 5 is formed of a transparent electrode material having excellent light transmittance, such as Indium Tin Oxide (ITO).

Figure 2:
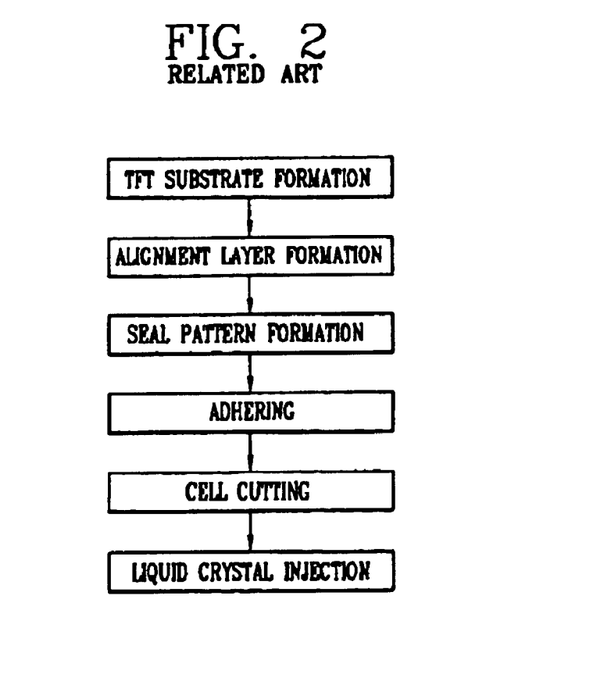
FIG. 2 is a flow chart for a fabrication process of an LCD device according to the related art.

FIG. 2 is a flow chart for a fabrication process of an LCD device according to the related art. In FIG. 2, the fabrication process includes steps of: preparing a lower (TFT) substrate; forming an alignment layer on the lower substrate; rubbing the alignment layer for alignment of liquid crystal material (not shown); forming a seal pattern; scattering spacers (not shown); bonding an upper substrate and the lower substrate together; cutting the bonded substrates into a plurality of unit cells; and injecting the liquid crystal material into the unit cell.

During the preparation of the lower substrate, a plurality of the gate lines horizontally arranged and a plurality of the data lines vertically arranged by crossing the gate lines are formed on the lower substrate. Then, a plurality of the thin film transistors are formed in a matrix configuration at the intersection points of the gate lines and the data lines. Next, the pixel electrode corresponding to the switching device T is formed on the TFT array substrate.

During the formation of the alignment layer, a thin film of polymer material is uniformly coated on the lower substrate. It is essential that the alignment layer is uniformly formed so that the subsequent process of rubbing the alignment layer may be uniformly performed and alignment of the liquid crystal material may be uniform.

During the process of rubbing the alignment layer, a cloth is used to rub the alignment layer along a constant direction to uniformly align the liquid crystal material. The rubbing process is important to set the initial alignment direction of the liquid crystal material. When the rubbing process is properly performed, normal driving of the liquid crystal material is possible to provide uniform driving characteristics of the LCD device. Generally, the alignment layer is formed of polyimide-based organic materials.

The seal pattern forms a gap between the upper substrate and the lower substrate for the liquid crystal material injection, and prevents the injected liquid crystal material from leaking out from the bonded substrates. Accordingly, during the formation process of the seal pattern, a constant pattern is formed along a periphery of an active region of the lower substrate using a thermosetting resin during a screen printing method.

During the process of scattering the spacers, spacers of a predetermined size are used in order to maintain a constant cell gap between the upper and lower substrates. Accordingly, the spacers have to be scattered uniformly on the TFT array substrate. Scattering methods of the spacers include a wet scattering method for scattering the spacers within an alcohol carrier solution, and a dry scattering method for scattering only the spacers without using a carrier solution. In addition, the dry scattering method includes an electrostatic scattering method using static electricity, and a non-electrostatic scattering method using gas pressure. The non-electrostatic scattering method is commonly used in the liquid crystal cell structure having a low static electricity resistance.

During the bonding process, the upper and lower substrates are bonded together along the seal pattern. The bonding process is determined by a predetermined margin between the upper and lower substrates, which may be several microns. If the bonded substrates exceed the predetermined margin, light may leak from the liquid crystal display device, thereby reducing the picture quality of driving the liquid crystal display device.

Next, the bonded substrates are divided into a plurality of unit cells by cutting the upper and/or lower substrates. In previous processes for cutting the liquid crystal cells, the liquid crystal material was simultaneously injected into several unit cells and the cells were cut as a unit cell. However, as the area of the LCD devices increased, the liquid crystal cells were first cut into the unit cells and then injected with the liquid crystal material.

Finally, the liquid crystal material is injected into the cut unit liquid crystal cells. The unit liquid crystal cell has a cell gap of several microns and an area of several hundreds of square centimeters. Accordingly, a vacuum injection method for injecting the liquid crystal material into the unit liquid crystal cells using a pressure difference between interior and exterior regions of the liquid crystal cells is commonly used.

Figure 3A:
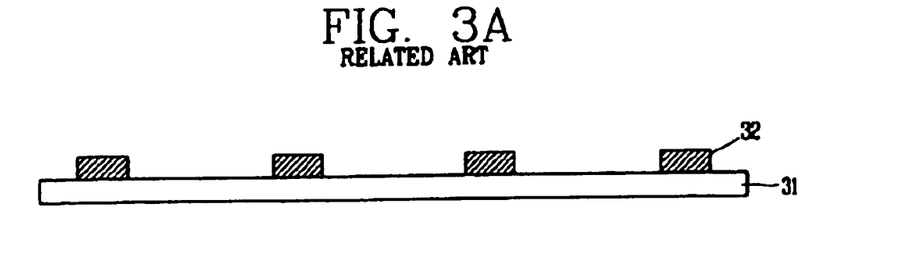
FIGS. 3A to 3F are cross sectional views of a fabrication process of an upper substrate of an LCD device according to the related art.

FIGS. 3A to 3F are cross sectional views of a fabrication process of an upper substrate of an LCD device according to the related art. In FIG. 3A, a black matrix 32 is formed on a transparent glass substrate 31 at a region of an upper substrate that corresponds to gate and data lines and switching devices of the lower substrate. Generally, the black matrix 32 is formed between sub-color filter of red, green, and blue, and blocks light that passes through a reverse tilt domain formed at a peripheral portion of a pixel electrode of the lower substrate. A material for forming the black matrix 32 includes a metal thin film, such as Cr, having an optical density more than 3.5, or an organic material. In addition, a double layer, such as Cr/CrOx, may be used for low reflection. Accordingly, a proper material of the black matrix may be selected for a desired purpose.

Figure 3B:
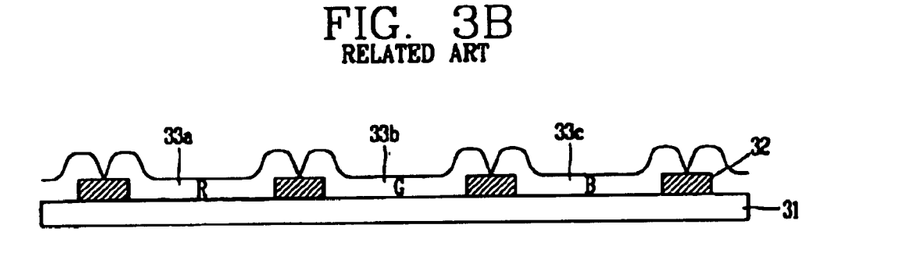

In FIG. 3B, a color filter is formed using a pigment scattering method. However, several different methods may be used, such as dyeing, depositing, and printing. First, a red color resin is deposited on the substrate 31 upon which the black matrix 32 has been previously formed. Then, the red color resin is selectively exposed to light, thereby forming a red sub color filter 33a at a desired region.

Next, a green color resin is deposited on the substrate upon which the red sub-color filter has been previously formed, and selectively exposed to light, thereby patterning the green sub-color filter 33b at a desired region. Likewise, a blue sub-color filter 33c is formed by repeating the same process.

Figure 3C:
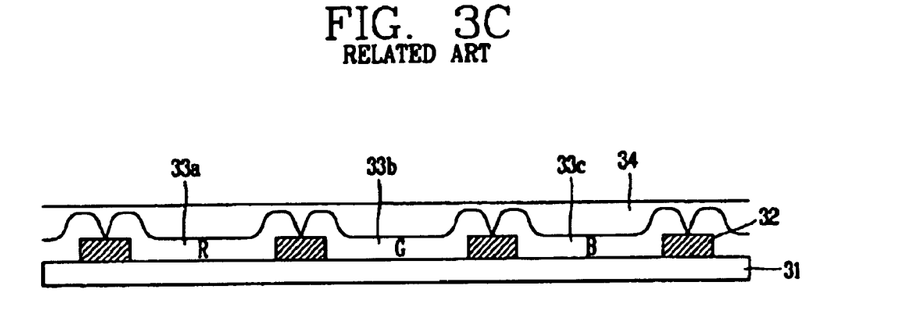

In FIG. 3C, a process for forming a overcoat layer 34 includes forming a transparent resin having an insulating characteristic on the substrate 31 upon which the sub-color filters 33a, 33b, and 33c have been previously formed, thereby forming an overcoat layer 34. The overcoat layer 34 is not necessarily formed and may be omitted. When a Cr-based metal is used as the black matrix 32, the overcoat layer 34 is not needed since a thickness of the black matrix 32 is as thin as a few thousands of angstroms. In addition, when a resin-based black matrix 32 is used, a thickness may be 1 to 1.5 μm, thereby requiring the overcoat layer 34.

Figure 3D:
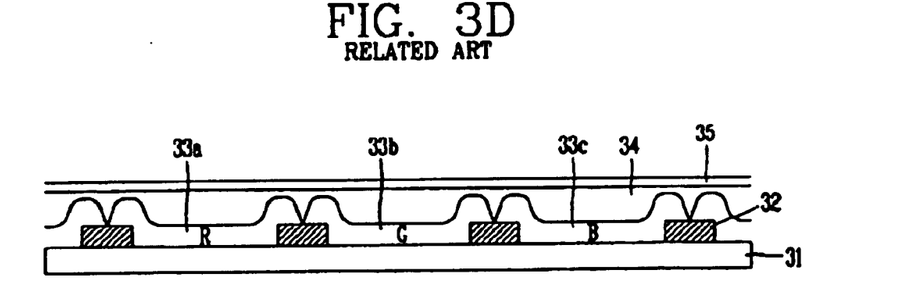

In FIG. 3D, a common electrode 35 is formed on the color filter substrate upon which the overcoat layer 34 has been previously formed. The common electrode is a transparent electrode and is commonly formed of indium tin oxide (ITO). A common voltage is supplied to the common electrode, so that an electric field is formed in combination with a pixel voltage applied to the pixel electrode on the array substrate, thereby driving the liquid crystal material.

Figure 3E:
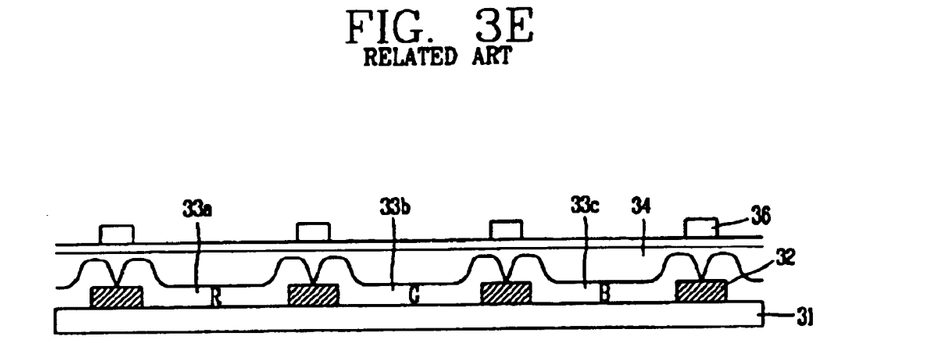

In FIG. 3E, spacers 36 are formed in which a transparent organic film is formed on the substrate 31 upon which the common electrode 35 has been previously formed, and the spacers 36 are patterned with a specific shape by photolithographic and an etching processes. Both shape and height of the spacers 36 are determined by the photolithographic process that includes a chemical reaction by irradiation of light and cross linking. Accordingly, the construction of the spacers 36 is changed into a net structure and the spacers 36 are resistant to etching. Thus, the spacers 36 may be formed having a more minute pattern, thereby increasing the mechanical strength of the spacers 36. Increasing the mechanical strength of the spacers 36 results in increasing mechanical deformation of the spacers. For example, in in-plane switching (IPS) mode LCD devices, an electric field is formed on the array substrate 31 and the metal-based black matrix may influence the electric field when the liquid crystal material is driven. Accordingly, carbon-based resins are used as the material of the black matrix 32. However, the carbon-based black matrix resins have a mechanical strength lower than that of the acryl-based color resin and the overcoat layer 34 so that the black matrix resin 32 is mechanically deformed by external impact to the spacers 36. In addition, the spacers 36 can be formed on the overcoat layer 34 prior to formation of the common electrode 35. However, the same problems regarding mechanic deformation may be generated.

Figure 3F:
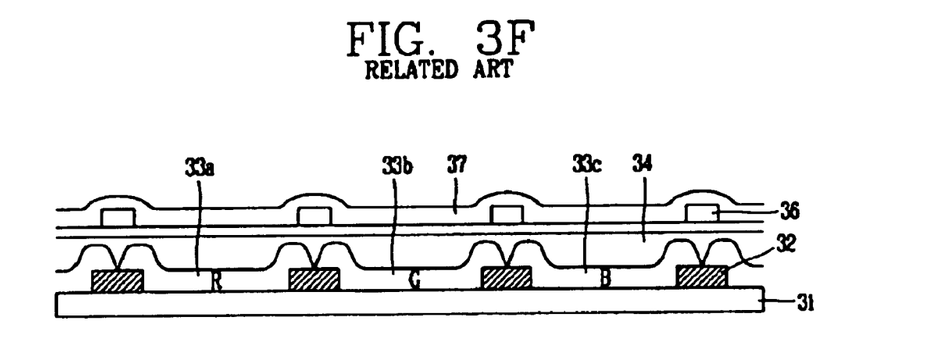

In FIG. 3F, a process for forming the alignment layer 37 includes forming an organic insulating film, such as polyimide, on the color filter substrate upon which the spacers have been previously formed. Then, a rubbing process is performed for forming a predetermined groove on the alignment layer 37 in order to provide an alignment of the liquid crystal material, thereby completing the upper substrate of the LCD device.

It is possible that the spacers 36 can be formed after forming the alignment layer 37. However, the alignment layer 37 is chemically damaged during the etching process. Thus, the alignment layer 37 is commonly formed after formation of the spacers 36.

However, during fabrication of the upper substrate of the LCD device and fabrication of the spacers 36, the spacers 36 are formed at a region corresponding to the black matrix 32. When external pressure is applied to the spacers 36, the carbon resin-based black matrix 32 corresponding to bottom portions of the spacers 36 are mechanically deformed such that the spacers 36 are deformed along a direction towards the black matrix 32. This is a significant problem in IPS-mode LCD devices that use the carbon resin-based black matrix. If the spacers are deformed, the cell gap is not uniformly maintained. Accordingly, differences in displayed image brightness are generated, thereby creating smear on the image screen. This phenomenon is also generated where the spacers 36 are formed at a color filter region of the upper substrate corresponding to the pixel region of the TFT array substrate of the LCD device.

SUMMARY OF THE INVENTION

Accordingly, the present invention is directed to a liquid crystal display device and method of fabricating a liquid crystal display device that substantially obviates one or more of the problems due to limitations and disadvantages of the related art.

An object of the present invention is to provide a liquid crystal display device having an improved a cell gap structure.

Another object of the present invention is to provide a liquid crystal display device having an improved spacer structure to prevent black matrix destruction.

Another object of the present invention is to provide a method of fabricating a liquid crystal display device having an improved a cell gap structure.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device includes a substrate, a black matrix layer on the substrate and having a first plurality of openings, a color filter layer on the black matrix layer and having a second plurality of openings, and a plurality of column spacers each contacting the substrate through the first plurality and second plurality of openings.

In another aspect, a liquid crystal display device includes a substrate, a black matrix layer on the substrate and having a first plurality of openings, a color filter layer on the black matrix layer, a plurality of column spacers on the color filter layer, and an alignment layer on the substrate, wherein the plurality of column spacers are aligned with the first plurality of openings.

In another aspect, a method for fabricating a liquid crystal display device includes forming a black matrix layer on a substrate, forming a color filter layer on the black matrix layer, forming a first plurality of openings through the color filter layer and black matrix layer to expose a surface portion of the substrate, and forming a plurality of column spacers within the first plurality of openings.

In another aspect, a method for fabricating a liquid crystal display device includes forming a black matrix layer on a substrate, forming a first plurality of openings in the black matrix layer to expose surface portions of the substrate, forming a color filter layer on the black matrix layer, and forming a plurality of column spacers on the color filter layer.

In another aspect, a liquid crystal display device includes a substrate, a black matrix layer on the substrate and having a first plurality of openings, a first color filter layer on the black matrix layer, a second color filter layer on the black matrix layer and within the first plurality of openings, an overcoat layer on the first and second color filter layers, a common electrode layer on the overcoat layer, and a plurality of column spacers on the common electrode layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXEMPLARY EMBODIMENTS

Reference will now be made in detail to the exemplary embodiments of the present invention, examples of which are illustrated in the accompanying drawings.

Figure 4A:
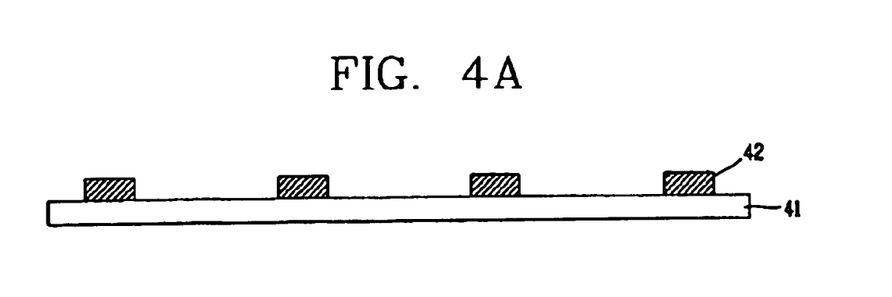
FIGS. 4A to 4G are cross sectional views of an exemplary fabrication process of an upper substrate of an LCD device according to the present invention.

FIGS. 4A to 4G are cross sectional views of an exemplary fabrication process of an upper substrate of an LCD device according to the present invention. In FIG. 4A, a substrate 41 of an LCD device may be prepared to include, but not limited to, a plurality of gate and data lines, switching devices, and pixel electrodes. Then, a black matrix 42 may be formed on the substrate 41 for covering the gate lines, data lines, and switching devices. Alternatively, the gate lines, data lines, and switching devices may be formed on a lower substrate of the LCD device. The black matrix 42 may be formed between sub-color filters of red, green, and blue, thereby blocking light that may pass through a reverse tilt domain formed along a peripheral portion of a pixel electrode of the lower substrate.

The black matrix 42 may include a metal thin film, such as Cr, or an organic carbon resin may be used. The black matrix 42 made of a Cr material may be used in LCD devices of a twisted nematic (TN) mode, wherein a common electrode may be located on the upper substrate and a pixel electrode may be formed on the lower substrate. In addition, in an IPS mode the common electrode and the pixel electrode may be formed on the same substrate, i.e., the lower substrate. Accordingly, since metallic materials used to make the black matrix 42 may influence an electric field generated by the common and pixel electrodes of the lower substrate a carbon resin black matrix material may be used. The present invention may improve the brightness of the LCD device using the carbon resin as a material of the black matrix 42. In addition, the carbon resin may also be used as a material of the black matrix 42 in the TN mode LCD device.

Figure 4B:
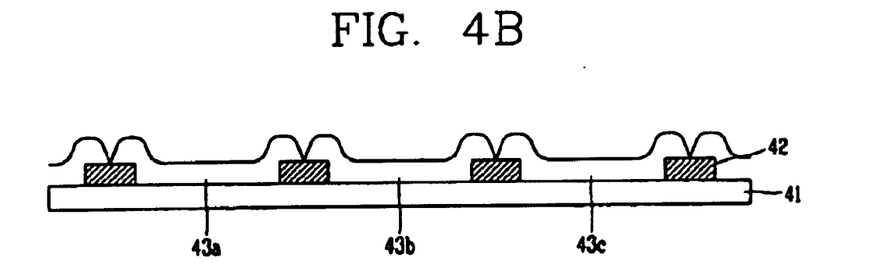

In FIG. 4B, a color filter having color resins of red, green, and blue may be formed on the substrate 41 and portions of the black matrix 42 using a pigment scattering method, for example. The color resin includes photosensitive color resins, such as monomers, and binder. Alternatively, several different methods may be used, such as dyeing, depositing, and printing.

First, the red color resin may be coated on an entire surface of the substrate 41 upon which the black matrix 42 may have previously been formed. Then, the red color resin may be selectively exposed to light, thereby forming a red sub-color filter 43a at desired regions of the substrate 41 and the portions of the black matrix 42.

Next, the green color resin may be coated on the substrate 41 upon which the red sub-color filter 43a may have previously been formed. Then, the green color resin may be selectively exposed to light, thereby forming the green sub-color filter 43b at desired regions of the substrate 41 and the portions of the black matrix 42.

Similarly, a blue sub-color filter 43c may be formed by repeating the above process. A fabrication order of the red, green, and blue sub-color filters 43a, 43b, and 43c may be rearranged.

Figure 4C:
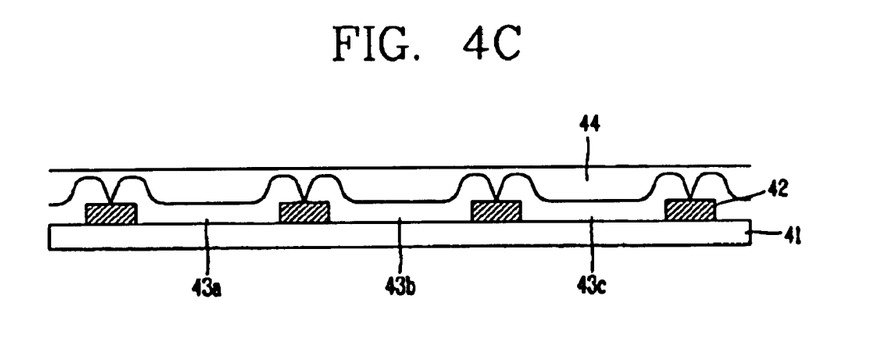

In FIG. 4C, an overcoat layer 44 made of a transparent acryl resin may be formed to compensate for any stepped regions between the black matrix 42 and the red, green, and blue sub-color filters 43a, 43b, and 43c.

Figure 4D:
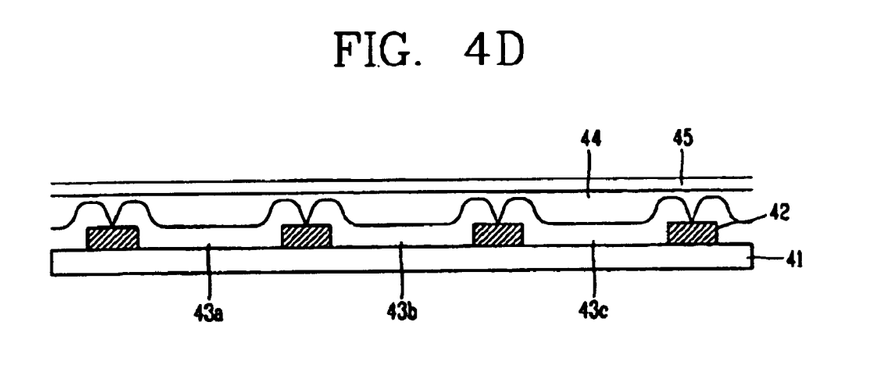

In FIG. 4D, a common electrode 45 may be formed on the overcoat layer 44. The common electrode 45, together with a pixel electrode formed on another substrate, may be used for supplying an electric field to the liquid crystal material, which will be subsequently formed. However, in the IPS mode LCD device, the common electrode may not necessarily be required.

Figure 4E:
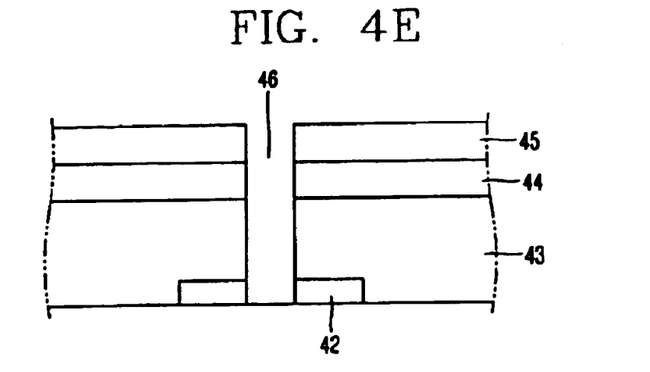

In FIG. 4E, portions of the common electrode 45, the overcoat layer 44, the sub-color filters 43a, 43b, and 43c (collectively referred to as a color filter layer 43), and the black matrix 42 on the substrate 41 may be partially removed by etching to expose a portion of the substrate 41 through opening 46. Alternatively, the common electrode 45, the overcoat layer 44, the color filter layer 43, and the black matrix 42 may be selectively formed to provide the opening 46 such that etching may not be necessary.

Since a portion of the black matrix 42 formed on the substrate 41 may be removed, light may leak from the lower substrate through the opening 46. Accordingly, a spacer may be formed within the opening 46 that is formed of a material that can block the leaked light, such as a colored resin material.

Figure 4F:
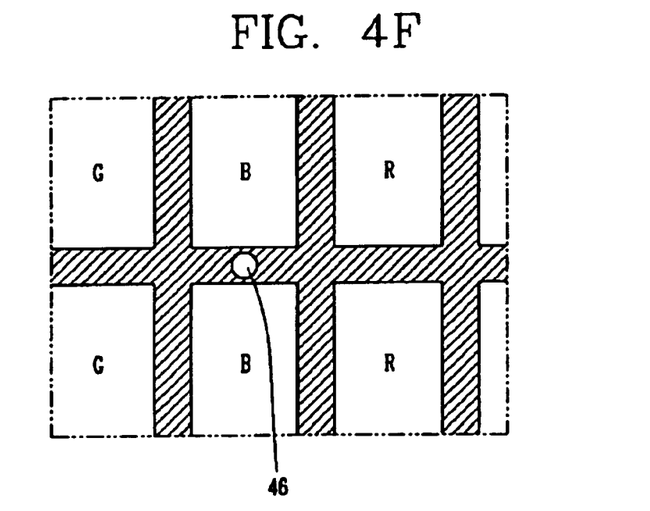

In FIG. 4F, the black matrix 42 (in FIG. 4E) may be formed within a region of the blue sub-color resin 43c since the blue sub-color resin 43c may have the highest intensity among the red, green, and blue sub-color resins 43a, 43b, and 43c. In addition, a size of the opening 46 may be approximately 10 μm in diameter.

Figure 4G:
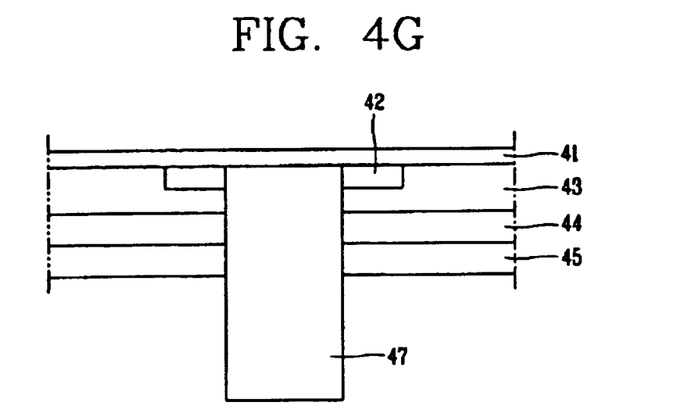

In FIG. 4G, the spacer 47 may be formed using a photosensitive resin and may be formed using photolithographic and etching processes so that the spacer 47 may be precisely aligned within the opening 46 (in FIG. 4F). Specifically, the column spacer 47 may include a matrix resin dissolved and swelled by alkaline aqueous solution, acryl monomer having ethylene unsaturated bonding number more than 2, or photo-polymerization initiator may be used. In addition, a width between sidewall portions of the opening 46 may be at least similar to a width of a bottom portion of the column spacer 47.

Although not specifically shown, a single spacer may be distributed among three adjacent pixel regions, or more. In addition, the spacer may be formed to maintain a cell gap of about 3 to 7 μm between the upper and lower substrates of the LCD device. Moreover, since the spacers may be formed to directly contact the glass substrate 41, the spacers may have a relatively larger size as compared to spacers according to the related art.

Figure 5A:
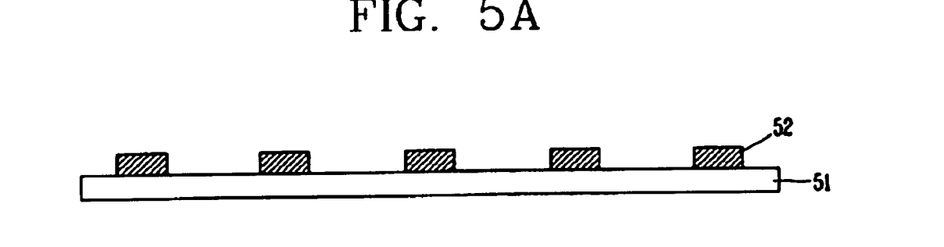
FIGS. 5A to 5C are cross sectional views of another exemplary fabrication process of an upper substrate of an LCD device according to the present invention.
Figure 5B:
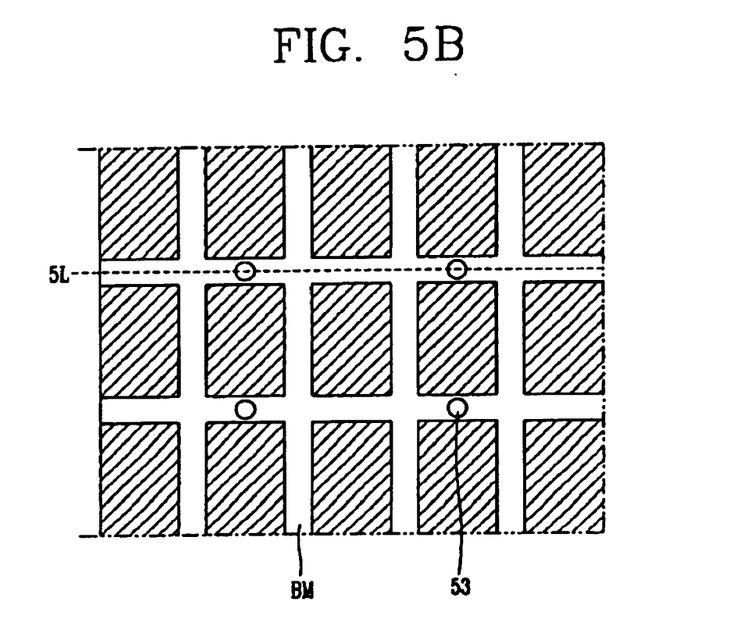
Figure 5C:
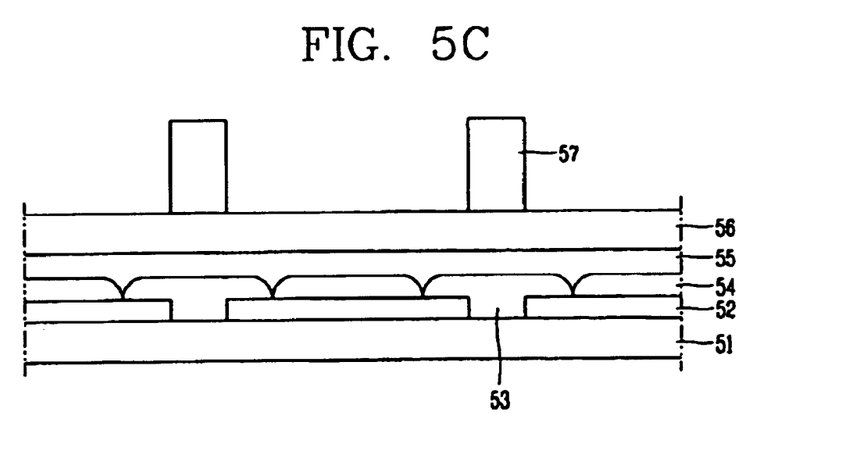

FIGS. 5A to 5C are cross sectional views of another exemplary fabrication process of an upper substrate of an LCD device according to the present invention. In FIG. 5A, a black matrix 52 may be formed on a substrate 51.

In FIG. 5B, portions of the black matrix 52 located at a point where spacers may be subsequently formed on the substrate 51 may be removed by photolithographic and etching processes, thereby exposing surface portions of the substrate 51. In addition, one opening 53 may be distributed among at least three adjacent pixel electrodes, or more. The opening 53 may be larger than the subsequently formed column spacer since the column spacer will formed within the opening 53. When the opening 53 is smaller than the column spacer, the black matrix 52 and the column spacer may overlap after arranging the column spacer within the opening 53. Thus, when an external pressure is applied, the black matrix 52 may be mechanically deformed, as in the related art. Since a size of the column spacer is approximately 10 μm in diameter, the opening 53 on the black matrix 52 should be larger than the 10 μm, or may be the same.

After forming the opening 53 in the black matrix 52, red, green, and blue sub-color resins (collectively called the color filter resin) may be applied by a pigment scattering method, for example, similar to the process shown in FIG. 4B. Then, as shown in FIG. 5C, an overcoat layer 55 and a common electrode 56 may be sequentially formed similar to the processes shown in FIGS. 4C and 4D.

FIG. 5C is a cross sectional view of the upper substrate of the LCD device when a dotted line 5L is a cutting line in FIG. 5B. Since the color filter resin may be arranged as a stripe on the substrate where the black matrix 52 is arranged, the color filter resin 54 may be located within the opening 53 and on the black matrix 52. In addition, column spacers 57 may be formed on the common electrode 56 aligned to the opening 53.

It will be apparent to those skilled in the art that various modifications and variations can be made in the liquid crystal display device and method of fabricating the same of the present invention with departing from the spirit or scope of the invention. Thus, it is intended that the present invention cover the modifications and variations of this invention provided they come within the scope of the appended claims and their equivalents.

What is claimed is:

1. A liquid crystal display device, comprising:

a substrate;

a black matrix layer on the substrate and having a first plurality of openings;

a color filter layer on the black matrix layer and having a second plurality of openings; and a plurality of column spacers each contacting the substrate through the first plurality and second plurality of openings, wherein each of the first plurality of openings are distributed among adjacent blue color resins of the color filter layer.

2. The device according to claim 1, wherein sidewall portions of the first plurality and second plurality of opening are aligned.

3. The device according to claim 1, further comprising an overcoat layer on the color filter layer and having a third plurality of openings.

4. The device according to claim 3, wherein sidewall portions of the first plurality and third plurality of openings are aligned.

5. The device according to claim 1, further comprising a common electrode on the color filter layer and having a fourth plurality of openings.

6. The device according to claim 5, wherein sidewall portions of the first plurality and fourth plurality of openings are aligned.

7. The device according to claim 1, wherein the plurality of column spacers include colored resin material.

8. A method for fabricating a liquid crystal display device, comprising:

forming a black matrix layer on a substrate;

forming a color filter layer on the black matrix layer;

forming a first plurality of openings through the color filter layer and black matrix layer to expose a surface portion of the substrate; and forming a plurality of column spacers within the first plurality of openings, wherein each of the first plurality of openings are distributed among adjacent blue color resins of the color filter layer.

9. The method according to claim 8, wherein the plurality of column spacers include a colored resin material.

10. The method according to claim 8, wherein the first plurality of openings and the plurality of column spacers are integrally formed.

11. The method according to claim 8, further comprising forming an overcoat layer on the color filter layer an having a second plurality of openings.

12. The method according to claim 8, further comprising forming a common electrode on the color filter layer and having a third plurality of openings.

* * * * *